(12) United States Patent
Tang et al.

(10) Patent No.: US 7,492,664 B2
(45) Date of Patent: Feb. 17, 2009

(54) METHOD FOR PROCESSING ACOUSTIC REFLECTIONS IN ARRAY DATA TO IMAGE NEAR-BOREHOLE GEOLOGICAL STRUCTURE

(75) Inventors: Xiao Ming Tang, Sugar Land, TX (US); Yibing Zheng, Houston, TX (US); Douglas J Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 104 days.

(21) Appl. No.: 11/342,145

(22) Filed: Jan. 27, 2006

(65) Prior Publication Data

US 2007/0097788 A1 May 3, 2007

Related U.S. Application Data

(60) Provisional application No. 60/731,977, filed on Oct. 31, 2005.

(51) Int. Cl.
*G01V 1/44* (2006.01)
*G01V 1/48* (2006.01)
*G01V 1/50* (2006.01)

(52) U.S. Cl. ............... 367/31; 367/25; 367/32; 367/57; 181/102; 181/105

(58) Field of Classification Search .......... 367/25, 367/31, 32, 35, 38, 56, 57; 181/102, 105
See application file for complete search history.

(56) References Cited

U.S. PATENT DOCUMENTS

| 4,752,916 | A |   | 6/1988  | Loewenthal |        |
|-----------|---|---|---------|------------|--------|
| 4,794,573 | A | * | 12/1988 | Bell et al. | 367/57 |
| 4,817,059 | A | * | 3/1989  | Hornby et al. | 367/28 |
| 4,881,208 | A | * | 11/1989 | Liu | 367/35 |
| 5,191,557 | A | * | 3/1993  | Rector et al. | 367/41 |
| 5,586,082 | A |   | 12/1996 | Anderson et al. | |
| 5,831,934 | A |   | 11/1998 | Gill et al. | |
| 5,899,958 | A |   | 5/1999  | Dowell et al. | |
| 5,995,447 | A |   | 11/1999 | Mandal et al. | |
| 6,430,508 | B1|   | 8/2002  | Sudhakar et al. | |

(Continued)

FOREIGN PATENT DOCUMENTS

WO      WO9852964       * 12/1998

OTHER PUBLICATIONS

Tsvankin, Ilya. "Normal moveout from dipping reflectors in anisotropic media." Geophysics, vol. 60, No. 1 (Jan.-Feb. 1995).*

(Continued)

*Primary Examiner*—Jack W Keith
*Assistant Examiner*—Scott A Hughes
(74) *Attorney, Agent, or Firm*—Bracewell & Giuliani LLP

(57) ABSTRACT

A method and apparatus for enhancing the moveout between a direct wave and a reflected wave. The method involves transmitting imaging signals into a body to be imaged and receiving the resulting signals propagated from the signal source. The step of receiving the propagated signals includes selectively adjusting the distance between the signal source and the signal receivers between successive signals. The method further comprises separating the reflected signals from the total received signals and enhanced stacking of the measured reflected signals.

15 Claims, 10 Drawing Sheets

U.S. PATENT DOCUMENTS 6,894,948 B2   5/2005   Brittan et al.
2004/0158997 A1   8/2004   Tang
2006/0031017 A1   2/2006   Mathieu et al.

OTHER PUBLICATIONS

Esmersoy et al., "Acoustic imaging of reservoir structure from a horizontal well," The Leading Edge, Jul. 1998, p. 940-946.

Hornby, "Imaging of near-borehole structure using full-waveform sonic data," Geophysics, vol. 54, No. 6, Jun. 1989, p. 747-757.

Joyce et al., "Introduction of a New Omni-Directional Acoustic System for Improved Real-Time LWD Sonic Logging—Tool Design and Field Test Results," Paper G in 42nd Annual Logging Symposium Transactions, Society of Professional Well Log Analysts, dated 2001, p. 1-14.

Li et al., "Single-well Imaging with Acoustic Reflection Survey at Mounds, Oklahoma, USA," EAGE 64th Conference and Exhibition, Florence, Italy, May 27-30, 2002, p. 1-4.

Tang et al., 4.2.3.1 Wave separation, p. 130, Chapter 4—Permeability Estimation, 2 pages.

Tang, "Imaging near-borehole structure using directional acoustic-wave measurement," Geophysics, vol. 69, No. 6, Nov.-Dec. 2004, p. 1378-1386.

Tang, "Predictive processing of array acoustic waveform data," Geophysics, vol. 62, No. 6, Nov.-Dec. 1997, p. 1710-1714.

Zheng et al., "Imaging near-borehole structure using acoustic logging data with pre-stack F-K migration," 75th Annual Meeting, Society of Expl. Geophysics, dated 2005, 4 pages.

* cited by examiner

METHOD FOR PROCESSING ACOUSTIC REFLECTIONS IN ARRAY DATA TO IMAGE NEAR-BOREHOLE GEOLOGICAL STRUCTURE

RELATED APPLICATIONS

This application claims priority from co-pending U.S. Provisional Application No. 60/731,977, filed Oct. 31, 2005, the full disclosure of which is hereby incorporated by reference herein.

BACKGROUND OF THE INVENTION

1. Field of the Invention

The present invention relates to a method and system of collecting and processing signal data. More specifically, the present invention relates to a method and system for enhancing a reflection wave signal in the background of a direct wave.

2. Description of Related Art

To obtain hydrocarbons such as oil and gas, boreholes or wellbores are drilled through hydrocarbon-bearing subsurface formations. The drilling of horizontal or deviated wellbores can create some difficulties of downhole imaging due to bed boundaries or dipping beds that are encountered downhole. To overcome this problem three dimensional borehole profiles have been developed. These three dimensional borehole profiles can change direction along the way.

A well bore drilled through earth formations encounters various geological structures intersecting the borehole. Borehole acoustic measurements can be used to obtain an image of the formation structural changes away from the borehole (Hornby, B. E. 1989, Imaging Near-Borehole of Formation Structure Using Full-Waveform Sonic Data, Geophysics, 54 747-757; Esmersoy et al., 1998, *Acoustic Imaging of Reservoir Structure from a Horizontal Well*, The Leading Edge, 17, No. 7, 940-946; Li et al., 2002, *Single Well Imaging with Acoustic Reflection Survey at Mounds, Oklahoma*, , USA: 64$^{th}$ EAGE Conference & Exhibition, Paper P141; Tang, 2004, *Imaging Near-Borehole Structure Using Directional Acoustic-Wave Measurement*: Geophysics, 69, 1-10; Zheng and Tang, 2005, *Imaging Near Borehole Structure Using Acoustic Logging Data with Pre-Stack F-K Migration*: 75$^{th}$ Ann. Internation. Mtg.: Soc. Of Expl. Geophys.) provided that the acoustic wave phenomena in the near borehole region are properly understood and utilized.

Data collection arrays, i.e. a collection of more than one single position point data recorders, are used in the collection of a myriad of data. Examples of array collected data include radar, seismic, acoustic, sonar, radio waves, to name but a few. Often the data received and recorded by such arrays can include unwanted signals that intermingle with the desired data and distort the final recordings thereby providing skewed results. Moreover, when dealing with arrays of data recording devices, the time lag between signals of the individual recorders is especially important.

Downhole sensors can be provided with a downhole tool for measuring downhole conditions. The downhole tool can include a sonde insertable within the wellbore as well as any subterranean drilling devices. Also included can be apparatuses for detecting inclination. These measurements are useful to determine hydrocarbons and water presence proximate to the downhole tool. These measurements can also be used to steer a downhole tool. However, the depth that these devices can monitor within the formation is limited and they typically do not provide bed boundary or dipping bed information. One example of a borehole imaging apparatus and method is found in U.S. Application No. 20040158997 (Ser. No. 10/353,330), published Aug. 19, 2004, which is incorporated by reference herein in its entirety.

BRIEF SUMMARY OF THE INVENTION

The present method disclosed herein includes analyzing acoustic data obtained from a geological formation by estimating direct wave data A from the acoustic data W from the moveout information E of the direct wave data then subtracting the direct wave data A from the acoustic data W thereby obtaining residual data R. The geological formation contains a geological bed boundary. The residual data R contains reflection wave data. They may be obtained by upwardly motivating a signal transmitter within the borehole, transmitting a series of signals into a geological formation from the signal transmitter, and receiving the signals propagating from the signal transmitter with a receiver. In order to correctly obtain data recorded above a geological bed boundary, the distance between the signal transmitter and the receiver should be reduced between successive signals. Reducing the distance between the signal transmitter and the receiver between successive signals enhances the moveout difference between the direct signals and the reflected signals. Optionally, the residual wave data R can be enhancement stacked to obtain reflected data.

The step of enhancement stacking may comprise selecting a time T sequentially along the total data recording time, wherein time T represents the time for the reflection wave to travel from a signal source to a designated signal receiver location where the reflection signal is to be estimated. Then calculating a distance Z using the selected time T, where Z represents the distance from the signal source to the intersection of a bed, a reflection from which will have a travel time T. The step may further include calculating a time $T_m$ for individual signal receivers within a receiver array, then finding the residue wave data $R_m$ for each receiver within the array for the calculated time $T_m$, and data sum/stacking of $R_m$ thereby obtaining wave reflection data R. The signals may be compressional waves, shear waves, Stoneley waves, and flexural waves. The method may further include migrating the residue data to image a subterranean boundary bed. Optionally, the present method may be combined with a subterranean drilling device and the method can be used to steer the drilling device.

The present disclosure further includes a borehole imaging device, where the device may comprise a signal transmitter capable of emitting a geological imaging signal into a borehole and a signal receiver capable of receiving the geological imaging signal emitted from the signal transmitter, wherein the distance between the signal transmitter and the signal receiver is selectively reduced between successive sequences of signal transmission and signal receipt. The successive reduction function can be accomplished by using selective receivers. The signal receiver of the device may include an array of signal receivers. The device may be included with a sonde, where the signal transmitter and receiver are attachable to the sonde. The device may be coupled with a drilling apparatus, where the device is used for steering the drilling apparatus.

A method of processing residual data containing reflection wave data is included, where this method includes sequentially selecting a time T along the total data recording time length, wherein time T represents the time for the reflection wave to travel from a signal source to a signal receiver, calculating a distance Z, where Z represents the distance from the signal source to the intersection of a bed, a reflection from which will have a travel time T, calculating a time $T_m$ for individual signal receivers within a receiver array, finding the residue wave data $R_m$ for each receiver within the array according to the calculated $T_m$, and data sum/stacking of $R_m$ thereby obtaining wave reflection data R.

DETAILED DESCRIPTION OF THE INVENTION

Disclosed herein is a method and apparatus for obtaining an image of geological structures in the near borehole formation by using acoustic reflections from these structures. The reflections are usually small and often indiscernible in the background of overwhelming acoustic waves that travel directly along the borehole and thus need to be properly analyzed and enhanced for utilization in the imaging application. The method disclosed herein includes two primary steps. The first is a wave separation step that separates the reflections from the direct waves according to their moveout difference in an acoustic array. The second step enhances the reflections by stacking them along the reflection time moveout in the acoustic array using a priori information about a structural dip or bed inclination in the formation.

The acoustic array disclosed herein is configured so that the reflections and the direct waves have the maximum possible moveout difference. Based on this criterion, two types of acoustic arrays, respectively called common source array and common receiver array, can be used to obtain down-going (reflected down-going) and up-going (reflected up-going) reflections. After separating the reflections from the direct waves, the reflections are further enhanced in the second step by stacking them along their time moveout in the acoustic array, allowing for detecting small reflection events that would otherwise be invisible in the background of noise. The reflection data from the above processing method, when used to image the near-borehole geological structures, significantly enhances the quality of the structural image compared to the one obtained from conventional methods.

Figure 1A:
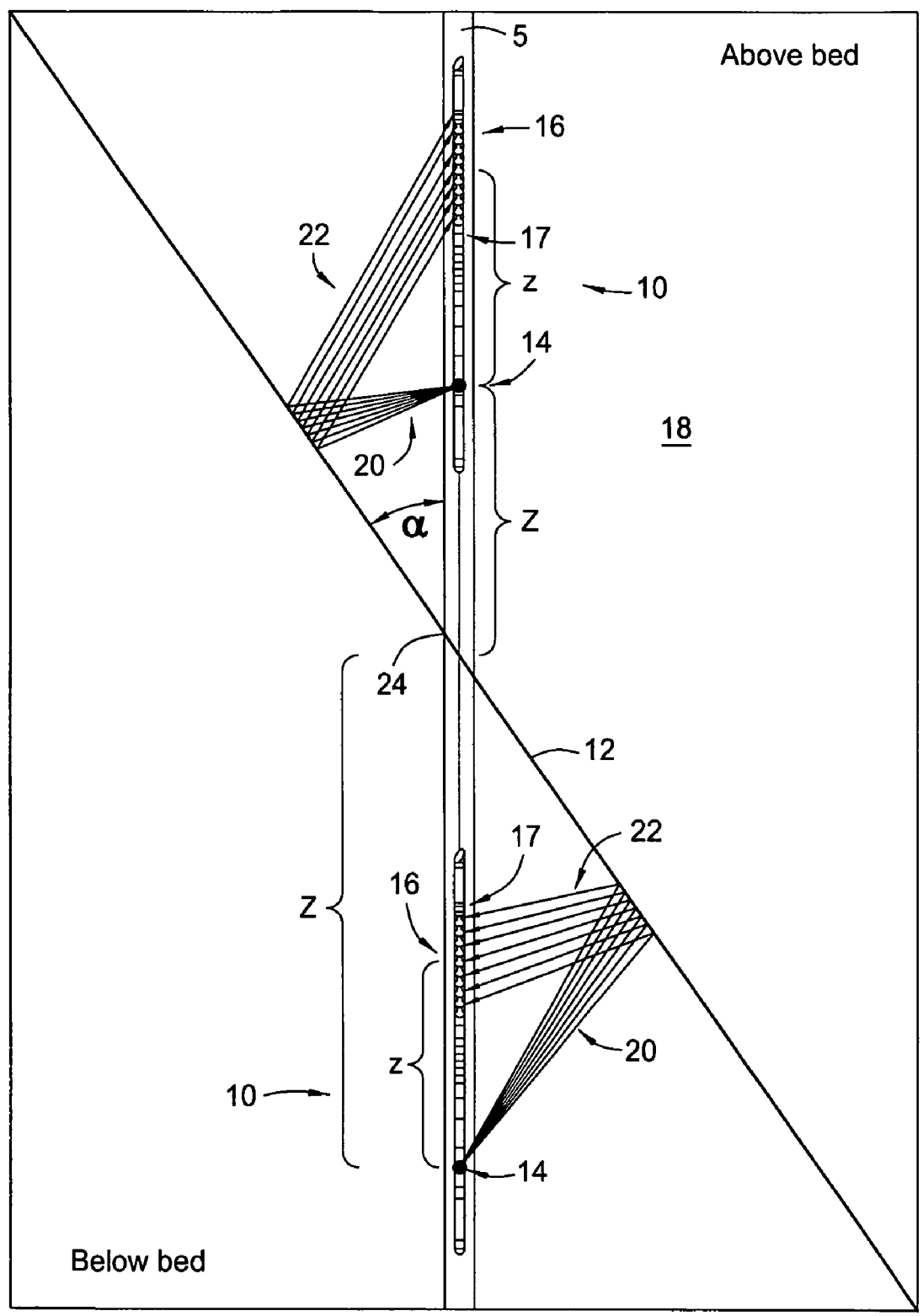
FIG. 1a depicts the logging of an embodiment of an acoustic tool across a dipping bed.

FIG. 1a depicts the logging of a wireline acoustic tool 10 across a dipping bed 12 (also referred to herein as a geological bed boundary) intersecting the borehole 5. The tool 10 includes an acoustic source 14 and an acoustic receiver 16. As the acoustic source 14 on the tool 10 is energized, it generates acoustic waves that can be classified into two categories according to their propagation direction. The first category of waves travel directly along the borehole 5, these waves are referred to as "direct waves". These direct waves are received by the acoustic receiver 16 and subsequently used to obtain acoustic parameters, such as velocity, attenuation, and anisotropy, etc., for the formation 18 adjacent to the borehole 5. Optionally, the acoustic receiver 16 can be comprised of an array of receivers on the tool 10.

The waves of the second category are the acoustic energy that radiates away from the borehole 5 and reflect/transmit back to the borehole 5 from boundaries of geological structures. These waves are called secondary arrivals in acoustic logging data because their amplitudes are generally small compared to those of the direct waves. As shown in FIG. 1a, depending on whether the tool 10 is below or above the bed 12, the energy of the emitted signal 20 transmits through the borehole 5 into the formation 18, strikes the lower or upper side of the bed 12 and reflects back to the receiver 16 as the secondary arrivals 22.

These reflection arrivals can be migrated to image the formation structural feature away from the borehole 5, in a way similar to the surface seismic processing. Another type of secondary arrivals in the data is the transmission of the wave energy across the bed boundary lying between the acoustic source and the receivers (Chang et al., 1998, *Localized Maps of the Subsurface*, Oilfield Review, 10, No. 1, 56-66). The reflected and transmitted waves can have different forms due to wave conversion at the boundary. These include P-to-P, P-to-S, S-to-S, and S-to-P reflection and transmission scenarios, where P and S respectively denote compressional and shear wave forms. The above descriptions illustrate the complicated wave phenomena occurring in the near borehole region and point out the need to properly analyze/process the data to extract the desirable events, i.e., the reflections, for the imaging application.

Because of the complicated wave phenomena in connection with acoustic logging, near-borehole imaging using acoustic logging data needs to accomplish two difficult tasks. The first is the extraction of the desirable reflection waves from the data that are dominated by the overwhelming direct arrivals. This is perhaps the major difference between imaging using borehole acoustic logging data and imaging using surface seismic data, although both follow the same imaging principle. Additionally, reflections in the acoustic logging data are mixed. For a single structure across the borehole, there are up-going and down-going reflections depending on the position of the tool 10 relative to the structure or dipping bed 12 (FIG. 1a).

The second task for the reflection processing herein described is enhancing the reflections in the background of various interfering waves, such as the transmitted/converted waves in the near borehole region, etc. With the ability to extract and enhance the reflections from acoustic logging data, the acoustic reflections, which are considered "noise" in the conventional (direct wave) processing, can be used to provide important information about near-borehole geological structures.

The method disclosed herein includes extracting and enhancing acoustic reflections from structures or discontinuities within the formation 18 based on moveout characteristics across the acoustic data array. The separation of the reflections 22 from the large direct waves, and the separation of the reflection data into individual up- and down-going waves critically depend on how the moveout of a designated reflection event differs from the moveout of other unwanted waves.

With reference again to FIG. 1a, the logging of an acoustic tool 10 in the borehole 5 penetrating a geological bed boundary 12 is illustrated. In the figure, depictions of the tool 10 conducting logging both above and below the bed 12 are provided. Also shown are how the corresponding signals (20, 22) are emitted from the acoustic source 14 and reflect back to the acoustic receiver 16 from the bed 12. As previously noted, the acoustic receiver 16 may comprise an array of N equally spaced individual receivers 17. As shown, the acoustic source 14 is located at a distance below the acoustic receiver 16. The intersection angle between borehole 5 and the bed boundary 12 is represented by the symbol α. The intersection point of the bed 12 and the borehole 5 is at distance Z away from the acoustic source. Let z (a variable) be the distance of an individual receiver 17 in array measured from the source 14.

At time zero (T=0), the acoustic source 14 emits a pulse (emitted signal 20), which propagates towards the bed boundary 12 and reflects back (secondary arrival 22) to the receiver 17 at a distance z away from the acoustic source 14. Using Snell's law, it can be easily shown that the arrival time T of the reflection event is given by the following three equations:

$$T = \begin{cases} \dfrac{\sqrt{z^2 + 4Z(Z-z)\sin^2\alpha}}{v}, & \text{(tool below bed)} \\ \sqrt{\dfrac{z^2 + 4Z(Z+z)\sin^2\alpha}{v}}, & \text{(tool above bed)} \\ \sqrt{\dfrac{z^2 + 4h^2}{v}}, & \text{(tool parallel with bed; } h = Z\sin\alpha, \alpha \to 0) \end{cases} \quad (1)$$

where v is the wave velocity of the formation 18, which can be either P- or S-wave velocity. It should be pointed out that the wave propagation velocity below the bed 12 differs from that above the bed 12. This difference is the cause of the reflection/transmission phenomenon.

The third equation in equations (1) is a special case where the bed 12 is parallel with the borehole 5 and is at a distance h away from the borehole 5. This equation can be derived by replacing Z sin α with h and letting α approach zero in either of the first two equations. The moveout of the reflection event across the receiver array is analyzed by taking the derivative of the arrival time T with respect to the receiver distance z, as in the following.

$$\dfrac{dT}{dz} = \qquad (2)$$

$$\begin{cases} \dfrac{z - 2Z\sin^2\alpha}{v\sqrt{z^2 + 4Z(Z-z)\sin^2\alpha}} = \dfrac{z - 2Z\sin^2\alpha}{v^2 T}, & \text{(tool below bed)} \\ \dfrac{z + 2Z\sin^2\alpha}{v\sqrt{z^2 + 4Z(Z+z)\sin^2\alpha}} = \dfrac{z + 2Z\sin^2\alpha}{v^2 T}, & \text{(tool above bed)} \\ \dfrac{z}{v\sqrt{z^2 + 4h^2}} = \dfrac{z}{v^2 T}, & \text{(tool parallel with bed, } h = Z\sin\alpha; \alpha \to 0) \end{cases}$$

The moveout of the reflection wave across the array depends on the receiver position z and the distance Z of the acoustic source 14 to the bed-borehole intersection 24, whereas the moveout of the direct wave has a constant slope, as given by dT/dz=1/v. Consider the tool approaching the intersection 24 from below. At a large distance Z, the apparent slowness (or slope) of the reflection moveout in array is negative, (dT/dz=−sin α/v, Z−>∞), the slope becomes zero as the tool 10 moves near the intersection 24 (dT/dz−>0, z−>2Z sin² α), and attains a maximum value when the receiver 16 reaches the intersection 24 (dT/dz=cos 2α/v, z=Z). When the source 14 and the receiver 16 are at the opposite sides of the bed 12, there is no reflection; but wave transmission/conversion at the bed boundary 12 close to the borehole 5 can occur, giving rise to various transmitted/converted waves in the early portion of the acoustic data (Chang et al., 1998). When the tool 10 is above the bed intersection 24, the reflection moveout slope is always positive (dT/dz>0) and gradually approaches sin α/v as the tool 10 moves further away. For the special case where the bed 12 is parallel with the borehole 5, the reflection moveout always has a positive slope, which approaches zero when the bed-to-borehole distance is large (dT/dz−>0, h−>∞).

The above analysis illustrates that the moveout difference between the reflection and direct waves in the receiver array is much greater for the below-bed scenario that for the above-bed scenario. The difference can be further demonstrated with modeling examples described below.

Figure 1B:
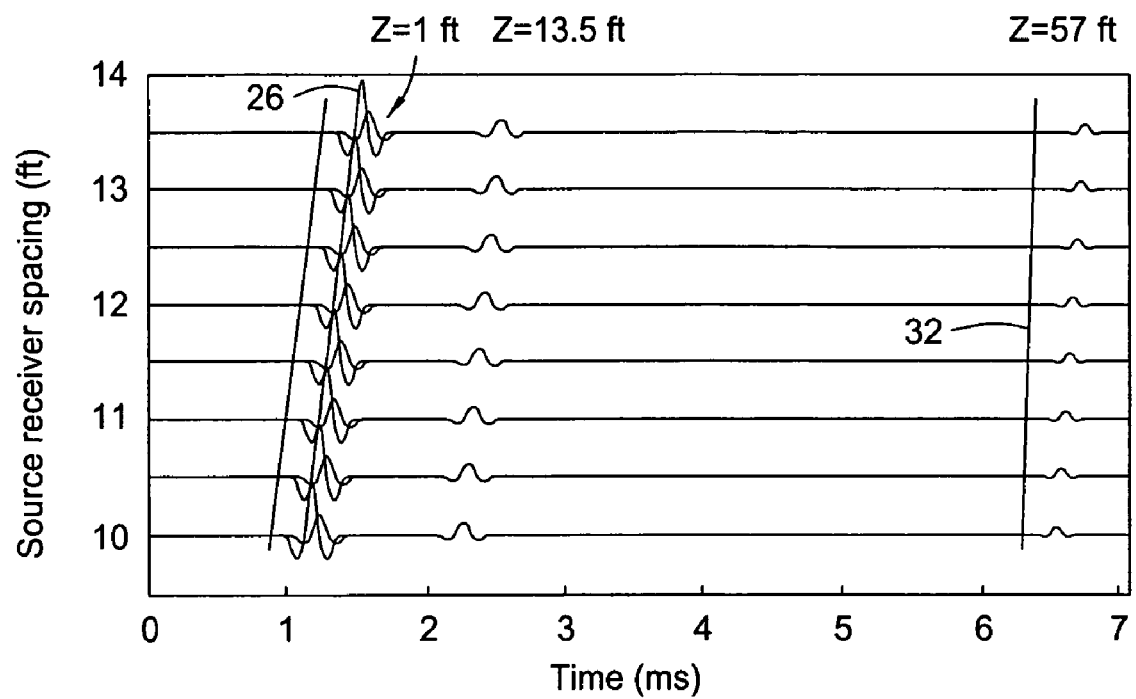
FIG. 1b demonstrates recorded acoustic waves from above the dipping bed.
Figure 1C:
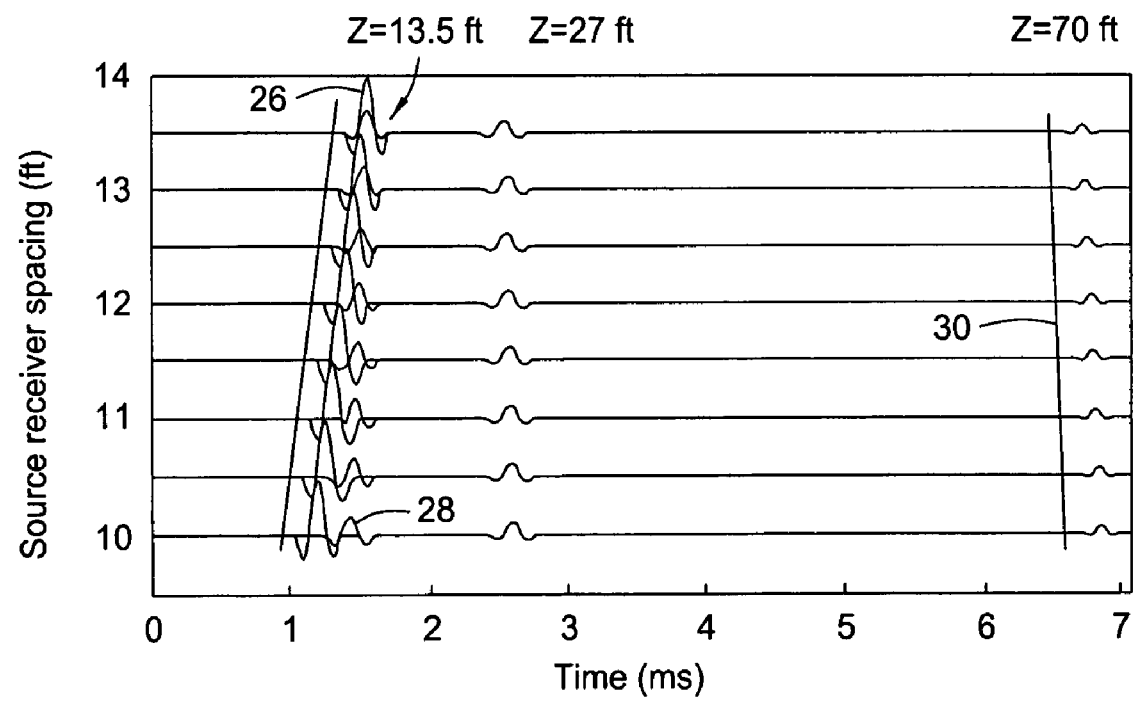
FIG. 1c shows recorded acoustic data for a below bed case.

FIGS. 1b and 1c demonstrate the moveout between the direct waves 26 and the reflected waves 28 for both above bed and below bed situations. More specifically, FIG. 1b demonstrates recorded direct and reflective waves (26, 28) for the above bed case and FIG. 1c shows recorded data for a below bed case. The data here was obtained via a software simulation; it is within the capabilities of those skilled in the art to conduct such simulations. In the simulation the bed intersection angle α is 30° and the formation velocity is 3000 m/s. For the purposes of the simulated data recorded in FIGS. 1b and 1c, the tool 10 has an eight-receiver array with an inter-receiver spacing of 0.5 ft and a transmitter source located 10 ft below the array. The direct wave is a 4-kHz center frequency Ricker wavelet which moves across the array with the given formation velocity (3000 m/s). In FIGS. 1b and 1c the amplitude of the reflected waves 28 relative to that of the direct wave 26 is at an arbitrary scale. The amplitude is deliberately enlarged to emphasize the reflections. But the amplitude's change with distance Z is controlled by geometric spreading (from a point source).

The below bed simulation was performed for three different distances from acoustic source 14 to the bed intersection 24:Z=13.5, 27, and 70 ft, respectively. The moveout of the reflected waves 28 is described by equations (1) and (2). For Z=13.5 ft, the reflected and direct waves (28, 26) overlay at the last receiver location where the receiver hits the bed at the intersection. At Z=27 ft, the moveout of the reflected waves has a (slightly) negative slope, because now the value of 2Z sin² α(=13.5 ft) starts to become greater than source-to-last-receiver distance (see first equation of equations (2)). At Z=70 ft, the slope of the reflection moveout is very close to −sin α/v, as indicated by the line 30.

For the tool-above-bed scenario (FIG. 1b), the reflection is calculated for three Z values: Z=1, 13.5, and 57 ft. For this scenario, the slope of the reflection moveout is always positive. At Z=1 ft where the source 14 just passes the bed intersection 24, the reflection starts to appear, with a moveout very close to that of the direct wave 26. At Z=13.5 ft, the reflective wave 28 separates from the direct wave 26 and its moveout slope becomes steeper than the direct wave. At Z=57 ft, the slope of the reflection moveout becomes close to sin α/v, as indicated by the line 32. The moveout characteristics above described can be used in conjunction with a wave separation method to separate the reflection wave 28 from the direct wave 26.

Reflections 28 can be separated from the direct waves 26 by applying a wave separation method to the array acoustic data.

This method assumes that the two types of waves (26, 28) have distinctly different moveout characteristics. As discussed earlier, the acoustic array data are composed of two categories of data. The first is the large-amplitude, overwhelming direct waves traveling from the source 14 to receivers 16 along the borehole 5. Examples of the direct waves include P, S, and Stoneley waves in monopole logging, and flexural wave in dipole logging, etc. These waves have a deterministic nature because their moveout slowness/velocity is either known or can be routinely obtained from processing the array acoustic data. In contrast, the waves of the second category are quite uncertain; their arrival time and moveout slowness/velocity are unknown or need to be determined. The second category data include various reflection waves and possibly, waves that transmit across bed boundaries 12 in the formation 18 and back into the borehole 5. Additionally, the data also include various acoustic "noises", such as acoustic reflection/scattering due to borehole rugosity, etc. The data of the second category are often small compared to those of the first category. Based on the amplitude and moveout characteristics of the different waves, as described above, the wave separation step can be accomplished by estimating the deterministic direct waves and subtracting them from the total acoustic data received by the acoustic receivers 16. The resulting residue data should contain the wanted reflections. A parametric array wave estimation method is used for the estimation. Although this method has been used in other applications (e.g., Tang, 1997, *Predictive Processing of Array Acoustic Waveform Data: Geophysics*, 62, 1710-1714; Tang and Cheng, 2004, *Quantitative Borehole Acoustic Methods*, Elsevier Science Publishing, Inc.), it is briefly described herein for the benefit of understanding its role in the current application. In this method, the direct waves are parameterized as a propagating wave mode with known moveout velocity v, but unknown complex wave spectrum $A(\omega)$, as $A_l(\omega)\exp(i\omega z/v_l)$, $(l=1, \ldots, L)$, where $\omega$ is angular frequency; $v_l$ is the velocity of the lth direct wave; and L is the total of direct waves. For example, for monopole data, L=3, including P, S, and Stoneley waves. To estimate the wave spectra at the nth receiver location (n=1, . . . ,N), the waves are connected to the recorded data $W_m(\omega)$, (m=1, . . . ,N) at all receiver locations. To do so, these waves are forward or reverse propagated to all receiver locations. For example, propagation of the wave $A_l(\omega)$, $(l=1, \ldots, L)$ at location n to location m is mathematically expressed by $A_l(\omega)$, $E_l^{m-n}$, $[E_l=\exp(i\omega d/v_l)]$, where d is receiver spacing. The location index m can be smaller than, equal to, or greater than the index n. Because the direct waves (A) dominate the recorded data (the second category data, as described above, are treated as noise in the current estimation), the sum of the propagated spectra to the measured wave spectral data can be equated at each receiver location. This results in:

$$nth\ \text{row} \rightarrow \begin{bmatrix} E_1^{1-n} & \cdots & E_L^{1-n} \\ \vdots & & \vdots \\ E_1^0 & \cdots & E_L^0 \\ \vdots & & \vdots \\ E_1^{N-n} & \cdots & E_L^{N-n} \end{bmatrix} \begin{bmatrix} A_1(\omega) \\ \vdots \\ A_L(\omega) \end{bmatrix} = \begin{bmatrix} W_1(\omega) \\ \vdots \\ W_n(\omega) \\ \vdots \\ W_N(\omega) \end{bmatrix} \quad (3)$$

or, in matrix notation, $$EA=W.$$

Because N, the total of receivers in array, is usually much greater than the number L of direct waves, equation (3) is solvable using a least-squares method. The least-squares solution of equation (3), in matrix notation, is given by $$A=(\tilde{E}E)^{-1}\tilde{E}W, \quad (4)$$

where ~ denotes taking a complex conjugate. This gives the estimated wave spectrum $A(\omega)$ for each wave at the designated location n. The sum of each estimated spectrum gives the total estimated wave spectrum of the direct waves in the data at the receiver location. After the direct waves are estimated from the above procedure, they are subtracted from the total data to give a residue (or residual) array data, as in the following.

$$R_n(\omega) = W_n(\omega) - \sum_{l=1}^{L} A_l(\omega), (n = 1, \cdots, N) \quad (5)$$

Transforming the residue spectral data into time domain gives the residue wave time signal. The resulting residue data (residual data), after suppressing the large-amplitude direct waves, should exhibit and contain the wanted reflection events (reflection wave data). However, whether this is true depends on how significantly the moveout of the reflection event differs from that of the direct wave, as can be explained by the wave estimation method described by equation (4). This method (or any moveout-based estimation method) estimates a desired wave by projecting and stacking the array data along the wave's move out (E), as can be seen by the operation $\tilde{E}W$ in equation (4), which means propagating/projecting the receiver data W (acoustic data) using the wave's moveout velocity $v_l$ (l=1, . . . ,L), as in matrix E, and summing them. Thus, if the move out of the reflection wave in array does not differ significantly from that of the direct wave, the reflection wave will contribute to the estimated wave and then be suppressed in the subsequent subtraction.

The synthetic data in FIGS. 1b and 1c can be utilized to demonstrate the result of the above wave separation method and its dependence on moveout difference between direct and reflection waves (26, 28). The input data comprise the sum of the direct wave 26 and the reflection waves 28 for the three bed intersection distances, which simulates the situation where reflection data from three reflectors are simultaneously recorded. For this simple data, there is only one direct wave (L=1) and its moveout velocity is known (v=3000 m/s). Estimating the direct wave using equation (4) and subtracting it from the input data using equation (5), we obtain both the direct and residue waveform data shown in FIG. 2 can be obtained.

Figure 2A:
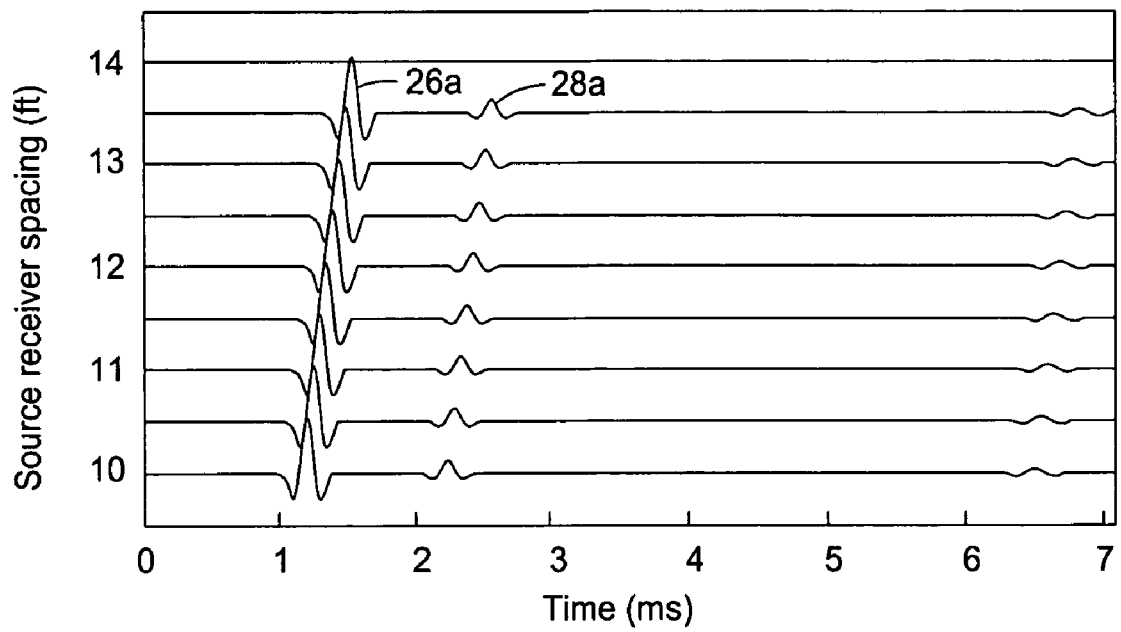
FIGS. 2a and 2b illustrate wave separation results of synthetic testing above the bed.
Figure 2B:
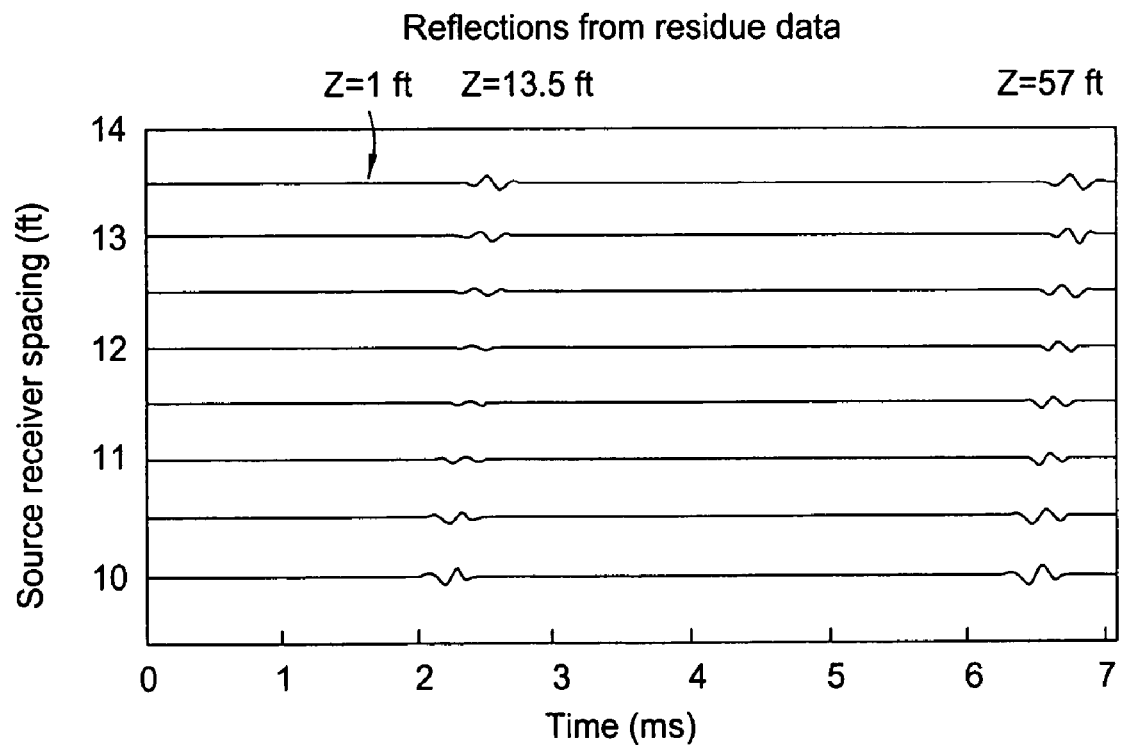
Figure 2C:
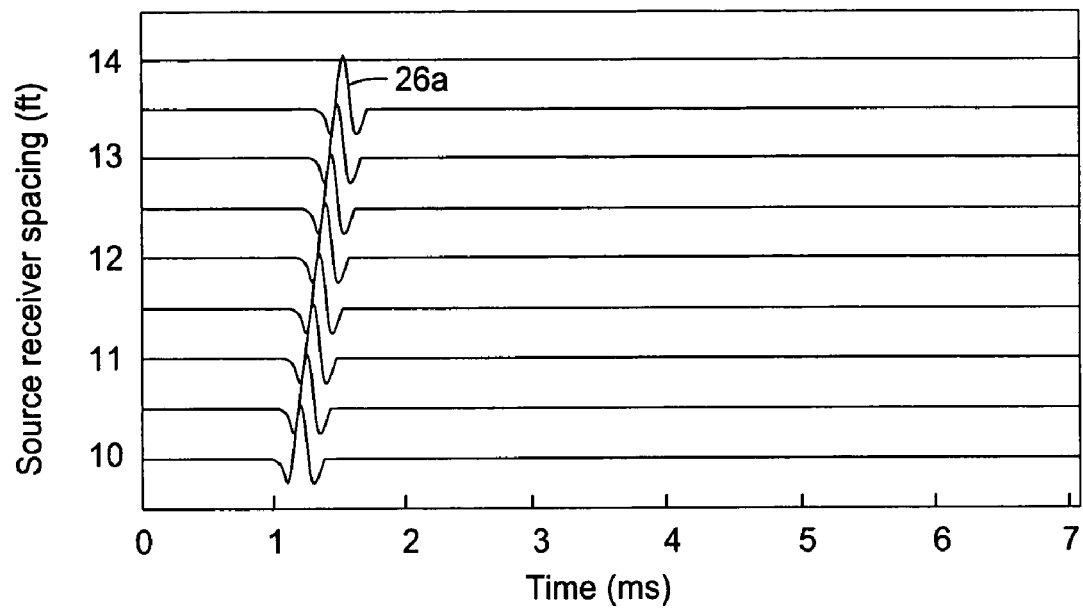
FIGS. 2c and 2d illustrate wave separation results of synthetic testing below the bed.
Figure 2D:
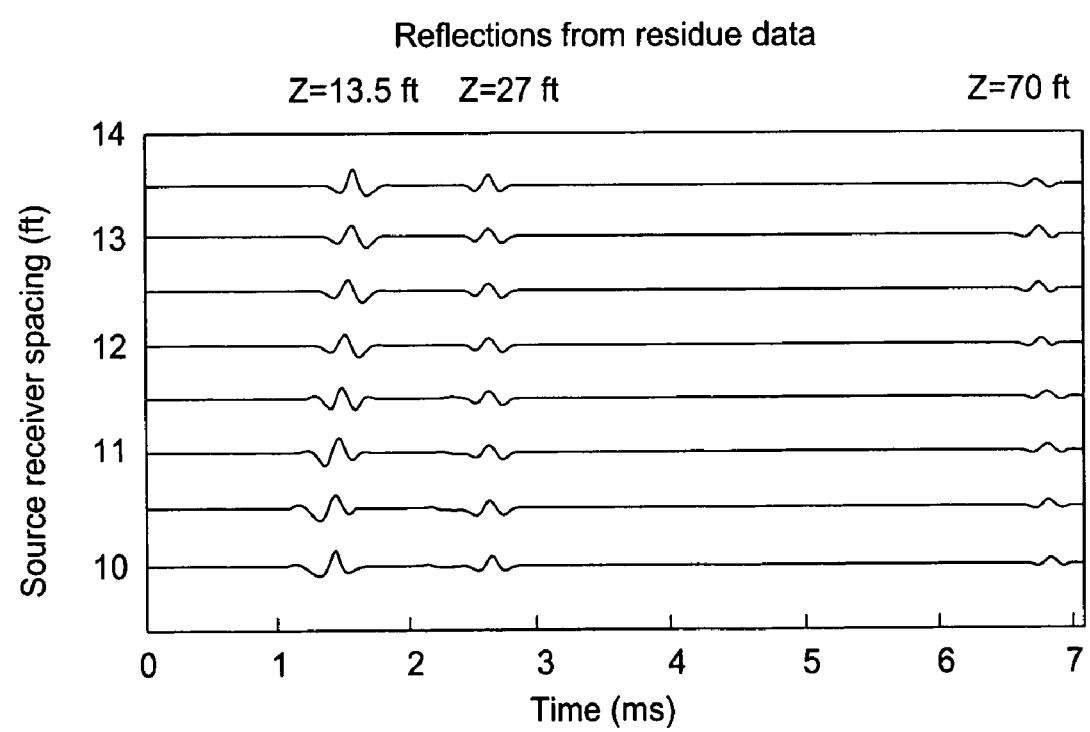

FIGS. 2a-2d illustrate the wave separation results of the synthetic testing for both the above bed (FIGS. 2a and 2b) and the below bed (FIGS. 2c and 2d). FIGS. 2c and 2d indicate that the moveout of the direct wave 26a differs more from that of the reflections 30 with regard to the above bed results. Accordingly, when the reflections are projected and summed along the direct wave moveout (see equation (4)), they have an almost zero contribution in the estimated direct wave of FIG. 2c. In contrast to the data results of FIG. 2b, those of 2d are satisfactorily recovered as compared to the input data in FIG. 1. This is true for all three cases of reflector distances. Only the data for the Z=13.5 ft case of FIG. 2d is slightly distorted because here the moveout difference between the direct and reflection waves (26a, 28a) is the smallest of all three cases. For the tool-above-bed result shown in FIGS. 2a and 2b, the separated reflections, especially for the Z=1 and 13.5 ft cases, are either nearly cancelled (for Z=1 ft case) or severely distorted (Z=13.5 ft case) compared to the input data in FIG. 1. This distortion reduces the wave amplitude and coherence across the array.

This happens because the reflections, when projected and summed along the direct wave moveout, have a non-zero contribution in the estimated direct wave data (FIG. 2a). This contribution, when used in the subsequent subtraction (equation (5)), suppresses or distorts the resulting reflection waves. The distorted waves will further be suppressed in the imaging process using migration/stacking methods. The data for the Z=57 ft case is less affected because the moveout difference between the direct and reflection waves is the largest of all three cases. Thus to separate a desirable reflection event from the direct waves the moveout difference should be maximized between these two types of waves.

Based on the foregoing discussion a reflection wave 28 is better extracted from the receiver array data when the tool 10 is below the bed boundary 12 than when the tool 10 is above the boundary 12. As such, the receiver array data (which is also referred to as common source gather) is used to obtain down-going reflection waves that illuminate the lower side of a bed boundary. The up-going (i.e., reflected up going) reflection waves in the receiver-array residue data have a significantly smaller amplitude compared to the down-going waves because a portion of these waves are removed in the subtraction.

Figure 3:
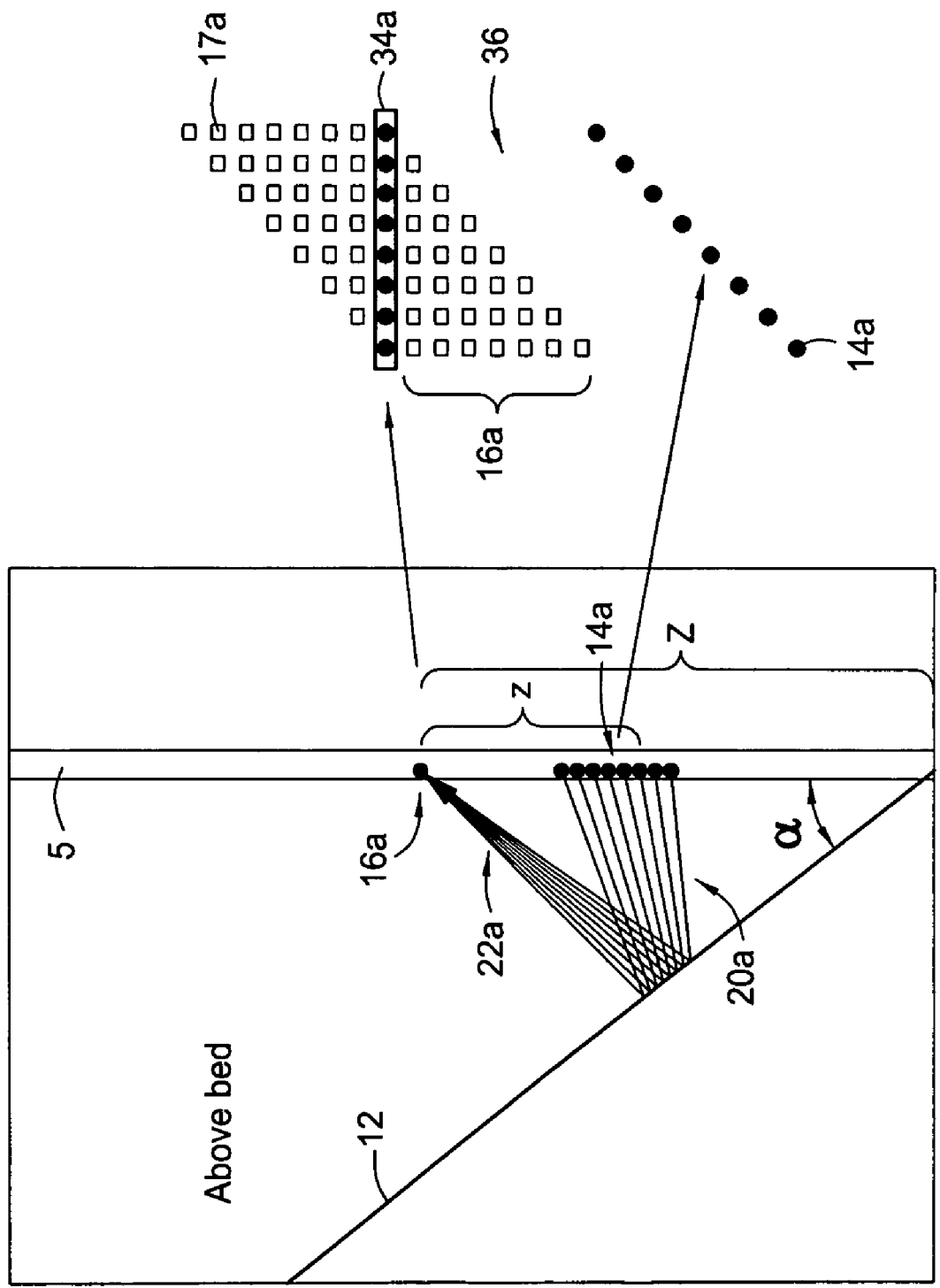
FIG. 3 illustrates in a schematic view data gathering for the above bed case.

To obtain up-going reflections that illuminate the upper side of a bed boundary it has been found advantageous to utilize the data-gathering scheme illustrated in FIG. 3. As shown, the common-receiver (location) gather, which is formed by gathering data for successive source positions that have the same fixed receiver location (in the language of acoustic logging, this data gather is called transmitter array). Gathering data this way is possible because in modern acoustic tools the receiver array (typically consisting of eight receivers) data generated from the transmitter source is recorded repeatedly after the tool travels a distance equal to the inter-receiver spacing d (typically 0.5 ft or 0.1524 m).

As illustrated in Fig. 3. the transmitter array 14a is formed by successively taking the nth receiver ($n=1, \ldots, N$) data from the receiver arrays of N adjacent source positions. For example, receiver 1 data is taken from the first array; receiver 2 data is taken from the second array whose position is a distance d below that of the first array, etc. The illustration exhibits successive emitted signals 20a at upwards positions. Corresponding locations of the transmitter 14a are shown as progressively moving upward.

The distance z between the transmitter 14a and the receiver 16a is reduced with each successive signal pulse. This is illustrated by showing the sequential position of the transmitter 14a and the receiving receiver 16a in the time array 36. The time array 36 shows a time-progressive representation of the transmitter 14a and the receiver array 16a, where the vertical movement over time of these transducers can be seen. Each column of the time array 36 represents the transmitter/receiver transducers at a point in time, each adjacent column illustrates how the transducers have been upwardly raised over some time t. However, the method disclosed herein does not gather recorded waveform data from each individual receiver 17a of the receiver array 16a. Instead, the data recorded by the individual receivers 17a shown in the box 34 is gathered. As can be seen from FIG. 3, relying on the data from the receivers 17a within the box 34 causes a reducing distance between the transmitter 14a and the receiver 17a with each successive transmitter-emitted signal pulse. This gather of data, i.e., transmitter array gather, for the situation where the acoustic tool is above the bed 12 intersecting the borehole, enhances the moveout difference between the direct waves and the reflected waves (20a, 22a). As discussed, enhancement of the moveout difference between these two waves necessarily provides for more readable and thus more accurate downhole reflected wave data. The reason for this enhancement is further explained below.

In the afore-mentioned data gather, data indexing in the transmitter 14a is in the downward direction. That is, the uppermost transmitter position has the smallest index (=1). Because of this indexing scheme, the moveout of a direct wave increases downward, i.e., toward the bed intersection.

Using the transmitter 14a of FIG. 3 above the bed, the moveout characteristics of up-going reflections relative to the direct wave are exactly the same as those of the down-going waves in a below-bed receiver array. This can be easily understood by comparing the paths of the emitted and reflected waves (20a, 22a) in FIG. 3. They are reverse to that of those in FIG. 1 (tool-below-bed scenario). In other words, the moveout difference between direct wave and up-going reflections in the transmitter array gather is significantly greater than it is in the receiver array gather. Thus, following the same wave separation procedure (i.e., estimating the direct waves and subtracting them from the data), the transmitter array residue data is obtained in which the up-going reflection is significantly larger than the down-going reflection. Therefore, gathering data respectively into receiver array and transmitter array effectively separates the reflection data into down- and up-going reflections.

The reflection data after wave separation, as contained in the residue data for either the receiver or transmitter array gather, may still contain other interfering signals. For example, the residue of direct waves after subtraction, although it is much smaller than the direct waves themselves, may still have an amplitude comparable to that of the reflection waves. This happens because the field data, unlike synthetic data as in FIG. 1, are usually contaminated by noise. The transmitted/converted waves of different types in the data, e.g., P-to-P, P-to-S, and S-to-P, are especially significant in the early portion of the data following the direct P-wave arrival. Wave scattering due to borehole rugosity is commonly an acoustic noise in the data. In addition, the up-going (down-going) reflections in the receiver (transmitter) array may not be completely suppressed in the subtraction and thus may also interfere with the down-going (up- going) reflections. These interfering waves, when significant, may render the desirable reflection event almost indiscernible, unless the event has significant amplitude (e.g., an event from a major reflector). In the presence of the strong interference of these other unwanted signals, stacking the reflection event across the data array is an effective way to enhance the wave event.

Having information regarding the bed intersection angle a, a method is described herein that utilizes equation (1) to stack the reflection data across the acoustic array. For a P-to-P reflection at the nth data gather location $z_n$, ($n=1, \ldots, N$) in the data array (either transmitter or receiver array), the reflection event arriving at time T should come from a bed boundary 12 whose intersection point 24 with the borehole 5 is at distance Z from the source location. This location is the location of the physical source for the receiver array 16. For the transmitter array this location is the receiver location where the data is taken to be the first data in the transmitter array 14a (see FIG. 3). Using the first equation in equations (1), the distance Z is expressed as:

$$Z(T)=0.5(z_n+\sqrt{(vT)^2-Z_n^2\cos^2\alpha}/\sin\alpha) \qquad (6)$$

where the formation P-wave velocity v is known, as can be conveniently taken from the P-wave velocity log obtained from direct wave processing. With the parameter Z calculated for the reflection event at the $z_n$ location, the arrival time of the event at other data locations $z_m$ (m=1, ...,N) can be calculated by using equations (1) again. Tracing the reflection event using its arrival time in array, summing/stacking the reflection data to the $z_n$ location can be done as $$R_n(T) = \frac{1}{N}\sum_{m=1}^{N} R_m(T_m) \qquad (7)$$

where $T_m$ is the reflection arrival time at receiver m, (m=1, ...,N), as is calculated by substituting the parameter Z given in equation (6) into the first equation of equations (1). Note that in equation (7) the variable "W" of Equation (5) is replaced with R since the stacking is for residue data from Equation (5). Calculating equation (7) for the entire recording time length and for all data gather locations, $z_n$ (n=1, ... N), a stacked data array is obtained. Because the stacking is along the moveout of expected reflection arrivals, reflection signals, if present, will be substantially enhanced. Other interfering signals, because they do not follow the designated reflection moveout, will be suppressed.

The above data stacking method needs to know the value of α, which in many cases needs to be determined from the acoustic data. For example, the bed angle is usually measured from the formation structural image obtained after migrating the reflection data to form the image. A question then arises as to how to obtain the a value for the reflection data processing. The following discussions show how to practically determine this a priori information.

The value of the α angle used for the stacking is only approximate and can be estimated by different ways. First, it can be estimated from a conventional dip log, if such a log is available. For acoustic data alone, the α angle can be estimated using different approaches. For example, if the reflection amplitude is sufficiently large, as is the case for a major reflector, the raw reflection data without stacking can be directly migrated to image the bed structure, as is usually done in conventional/exiting imaging applications. The resulting image provides a good estimate of the angle for strong reflectors. The α value can also be roughly estimated by a trial method, selecting the value from a number of values that produces the best image quality. The stacking process, as described by equations (6) and (7), can use an approximate, or even inaccurate a value for events from distant reflectors, although the accuracy of this value may affect the near-borehole reflections. For reflections coming from distant reflectors, the travel time across the array of relatively small aperture (typically 3.5 ft or 1.07 m) is small compared to the travel time over the total traveled distance (several tens of or even over hundred feet).

As discussed in more detail below, it has been discovered that stacking with an incorrect α value will not significantly change the time position of the reflection event and therefore will not change the position of the (distant) reflector in the migrated image, although it may affect the image quality of it. For example, a typical transmitter to receiver distance could be around 10 feet whereas a distant reflector could be at several tens of feet away. However, for near-borehole reflections arriving in the early portion of the time data, the reflection travel time across the array is not small compared to the total travel time and the accuracy of the α value becomes important. In other words, an accurate α value can significantly improve the near-borehole image quality while an inaccurate value may decrease the image quality.

Based on the above explanations, a practical way for using the stacking is as follows. First use raw data, or the data stacked with a roughly estimated α, to obtain the structural image of the formation. Estimate the α value by measuring the structural image of (major) bed boundaries away from borehole, e.g. a major bed boundary could be a bed boundary having a large acoustic impedance contact, usually when both sides of the bed have substantial lithological differences. Then, use the estimated α value to stack the data and obtain refined imaging results. The results for the near-borehole region should be significantly improved/enhanced.

After the data processing using the above described analyses/method, the remaining task of reflection data migration and imaging can use the conventional/existing processing methods. Because of the large amplitude direct waves, the conventional methods also need to suppress/remove the direct waves before processing the secondary arrivals of much smaller amplitude.

As described in Li et al. (2002) paper, a band-pass filtering technique may be used to first remove the low-frequency events, such as the low-frequency Stoneley waves generated by a monopole source, or the low-frequency flexural-shear waves generated by a dipole source. Afterwards, acoustic data are gathered in the depth domain to separate the secondary reflection arrivals from the direct arrivals based on their moveout characteristics. For example, in the single-receiver data gathered for various depths (or tool positions), the direct arrivals have a small moveout because their propagation distance (source-to-receiver spacing) is fixed. In comparison, the reflection events have a large moveout because their propagation distance changes as the tool moves close to or away from the reflector.

For the data gathered in the depth domain, a number of techniques can be used to remove the direct waves, e.g., f-k (Hornby, 1989), or a combination of f-k and median filtering (Li et al., 2002), etc. These techniques, however, do not distinguish up- and down-going reflection waves. An example of applying the techniques is provided in FIG. 6. Nevertheless, they can be applied separately to the up- and down-going reflection data as obtained using the present technique, to suppress the residue of the direct waves in the data. The resulting data will be almost free of the direct wave effects.

The up- and down-going reflection events, as obtained from the above processing procedures, are then respectively migrated to image the upper and lower side of the formation reflector. Several migration techniques can be used, e.g., the back-projection scheme using a generalized Radon transform (Hornby, 1989), or the commonly used Kirchoff depth migration method (Li et al., 2002), or the pre-stack f-k migration method adapted to acoustic logging configuration (Zheng and Tang, 2005). The migration procedure needs a velocity model to correctly map the reflection events to the position of a formation reflector. For the acoustic logging data, the P-wave velocity obtained from the acoustic logging measurement is conveniently used to build the velocity model. (Hornby, 1989; Li et al., 2002).

After migration, the acoustic reflection data can be mapped into a two-dimensional (2D) domain. One dimension is the radial distance away from the borehole axis; the other is Z, the logging depth, or the tool position, along the borehole. Structural features such as dip/inclination and continuity, etc., on the image map can then be analyzed to provide information about the geological structures.

Figure 4:
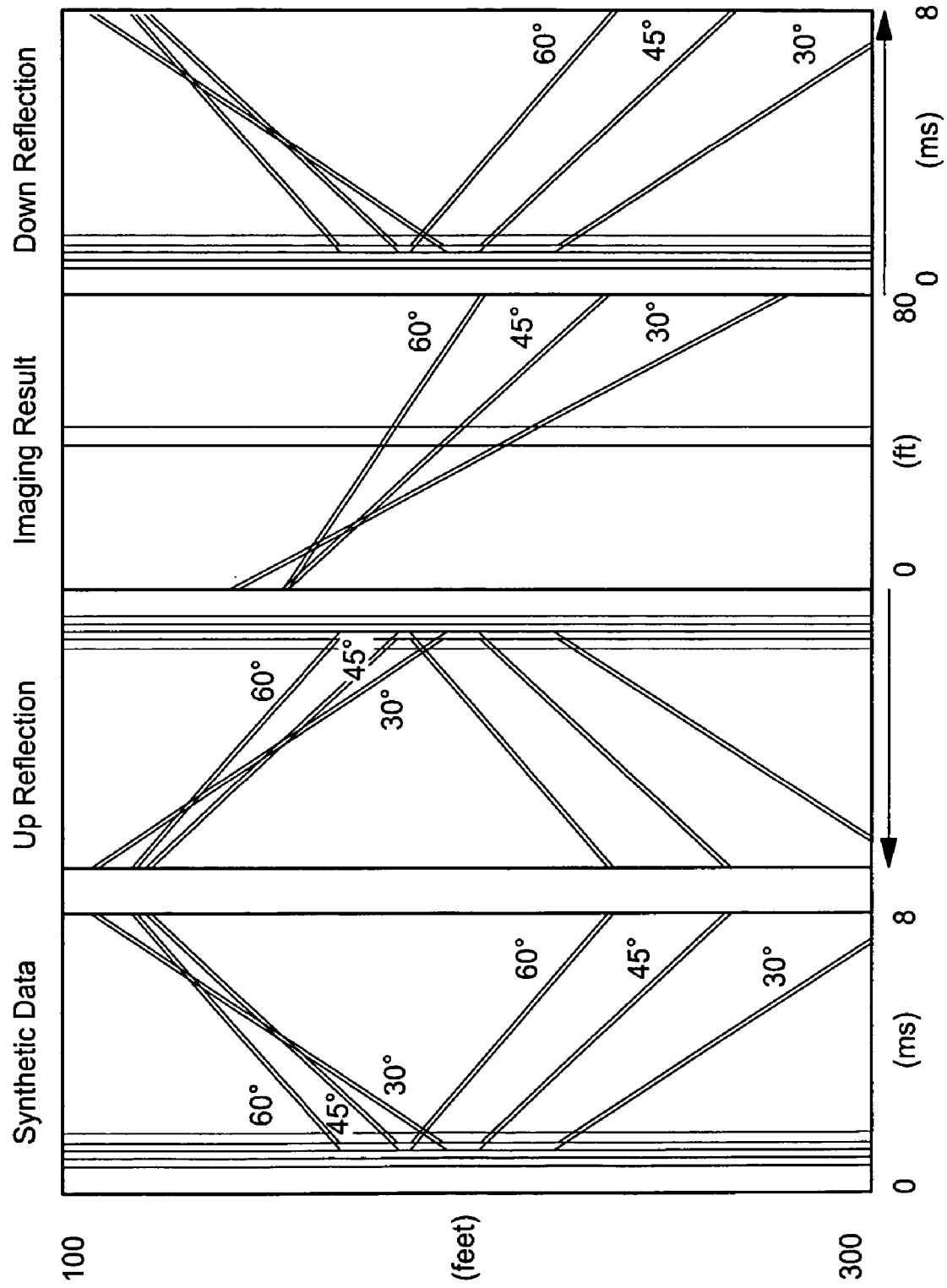
FIG. 4 portrays data results of reflection data processing and imaging.

With reference now to FIG. 4, data results of reflection data processing and imaging using synthetic data are illustrated. Track 1 of that figure is a VDL display of the synthetic modeling data calculated for receiver 1 of an eight-receiver array. In the synthetic analysis the source-receiver distance z is 12 ft and the formation P-wave velocity is 3810 m/s. Three bed reflectors are used to generate the reflections. They are spaced 15 ft apart, crossing borehole at 30°, 45°, and 60°, respectively, as indicated by dotted thin lines in track 3 of FIG. 4. For simplicity, the change of reflectivity with wave incident angle to the bed is ignored and a constant reflectivity value is assigned to each bed. The values are 0.1, 0.08, and 0.06 for the lower, middle, and upper reflectors, respectively. The direct wave is assumed to have a unit amplitude of 1. These given wave amplitude values were respectively assigned to the arrival time of the direct wave (given by z/v) and those of the reflection waves (calculated using equations (1)) to give an impulse response of each event. The impulse response was subsequently convolved with a 5-kHz center frequency wavelet to generate waveforms. The calculation was repeated for all receivers spaced at 0.5 ft and for all source positions incremented at 0.5 ft. The result provides the synthetic data for the testing.

In the single-receiver data shown in track 1, the direct wave is clipped to show the small-amplitude reflections. The up-going reflections overlap because of the intersection of the reflectors in the up-dip direction (see track 3). This tests the ability of the technique to separate the waves and the subsequent migration to image the reflectors.

The synthetic data processing results are shown in tracks 2 and 4 of FIG. 4. They respectively display the result of applying wave separation (equation (5)) and reflection stacking (equation (7)) to the transmitter array and receiver array data. For the a priori $\alpha$ value used in the stacking, a value of 45° from the middle reflector was chosen. This provides a test for the tolerance of the stacking method to an inaccurate $\alpha$ value. The processing effectively separates the reflection data into dominantly up-going (track 2, plotted right to left, from transmitter array) and down-going (track 4, plotted left to right, from receiver array) waves, although some weak images of unwanted reflections can still be seen. These weak events correspond to up-going (down-going) waves in the receiver (transmitter) array that are suppressed in the wave separation and the subsequent stacking procedures. It should be pointed out that despite the incorrect a priori a value to stack the waves from the 30° and 60° reflectors, individual up- and down-going reflections are satisfactorily obtained, as compared to the original data. Only the early portion of the reflections are somewhat smeared by the incorrect $\alpha$ value; the later portion of the data is much less affected. The reflection for the 45° reflector is almost exactly recovered because the true a value is used in the stacking.

The up- and down-going data are respectively migrated to the spatial domain to form the up-dip (left-hand side) and down-dip (right-hand side) image (track 3) of the reflectors. The reflection images coincide with the true reflector positions (dotted thin lines) very well despite their intersection in the up-dip direction. The image for the 60° reflector is valid only in the near borehole region. This happens because the waves within the 8-ms recording time originate from the near-borehole sector of this larger angle reflector. This relates to the well known "limited aperture problem" in migration. The testing result shows that the wave separation and stacking methods effectively separate the reflection data into up- and down- going waves and that the data enhancement stacking can indeed use an inaccurate a priori intersection angle $\alpha$.

Figure 5:
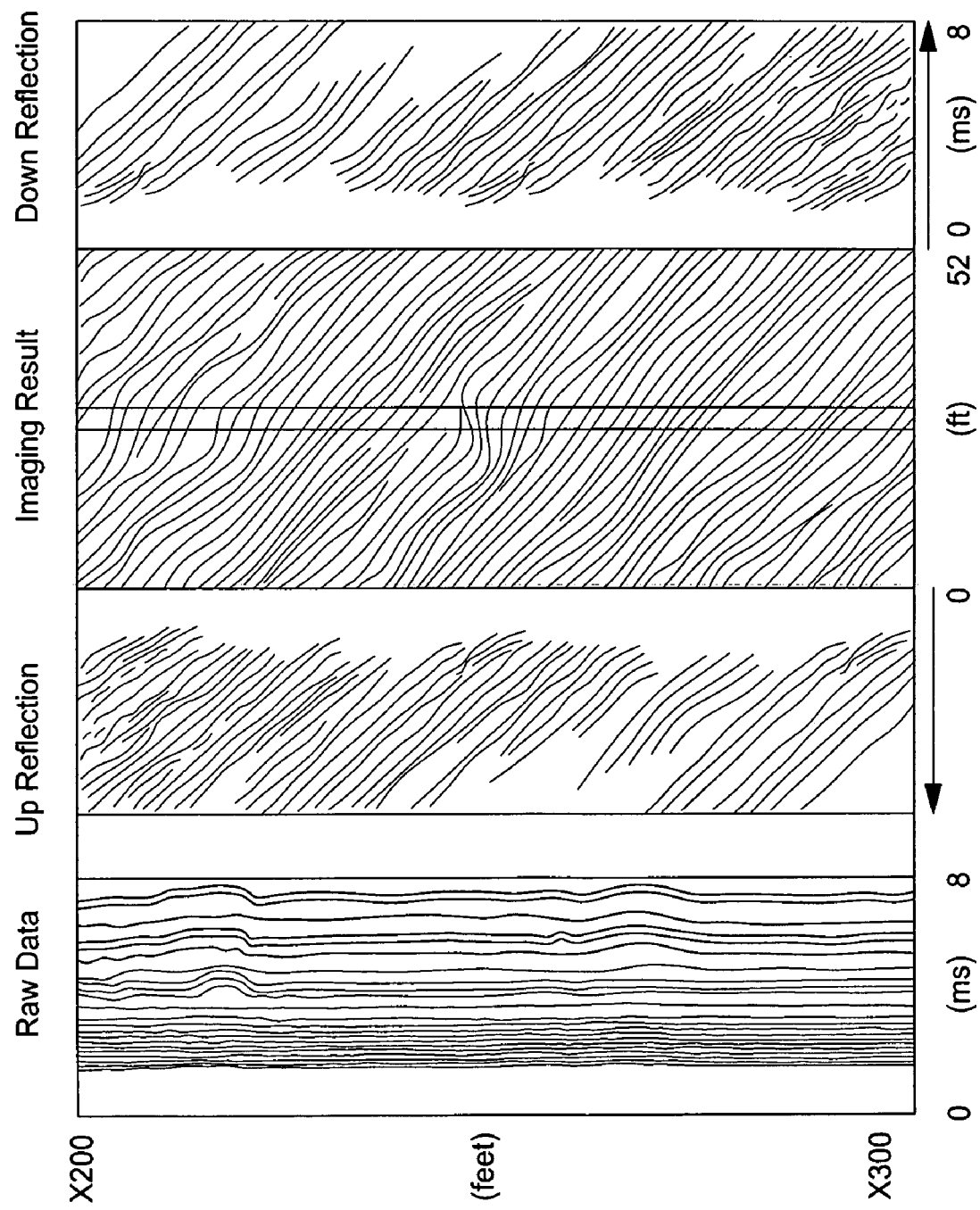
FIG. 5 contains examples of acoustic imaging using separated reflection data.

FIG. 5 shows the application to an acoustic logging data set acquired in an acoustically slow formation. Only data from receiver 1 of an eight-receiver array are displayed in the leftmost track. The single receiver data show the typical P (early higher frequency arrival) and Stoneley (later low-frequency event) waves for a slow formation, with some faint traces of reflection events around X200 and X300 ft. For this slow formation (P velocity–2600 m/s), as compared to a fast formation, P waves can be excited in a lower frequency range. The data processing frequency range is then set to 1-5 kHz. The processing results are shown in the next three tracks. The respective application of the wave separation method to the receiver array and transmitter array data effectively separates the reflection data into up-going (track 2) and down-going (rightmost track) waves. The up-going (down-going) waves in the down-going (up-going) data, although they are still faintly visible for major reflectors, are largely suppressed. The wave separation results from field data processing are very much as expected from the synthetic data example shown in FIG. 2, which confirms the validity and applicability of the method described herein to field acoustic data processing. The up- and down-going data are respectively mapped, or migrated, to the spatial domain to form the up-dip (left-hand side) and down-dip (right-hand side) image (track 3) of formation reflectors. The image result reveals several bed boundaries crossing the borehole at about 45°. Comparing the reflection data and the image result shows that the quality of the image is closely related to the quality of the reflection data. For example, the down-dip event in the image map, as indicated by an arrow, can be clearly associated with a low amplitude but quite coherent reflection event in the down-going data. Without the up- and down-going wave separation, this reflection is hardly visible. See the raw reflection data shown in leftmost track in FIG. 6. Therefore, a benefit of the up- and down-going wave separation is that the data quality of the separated individual reflection event can be used as a quality indicator for the image result.

Figure 6:
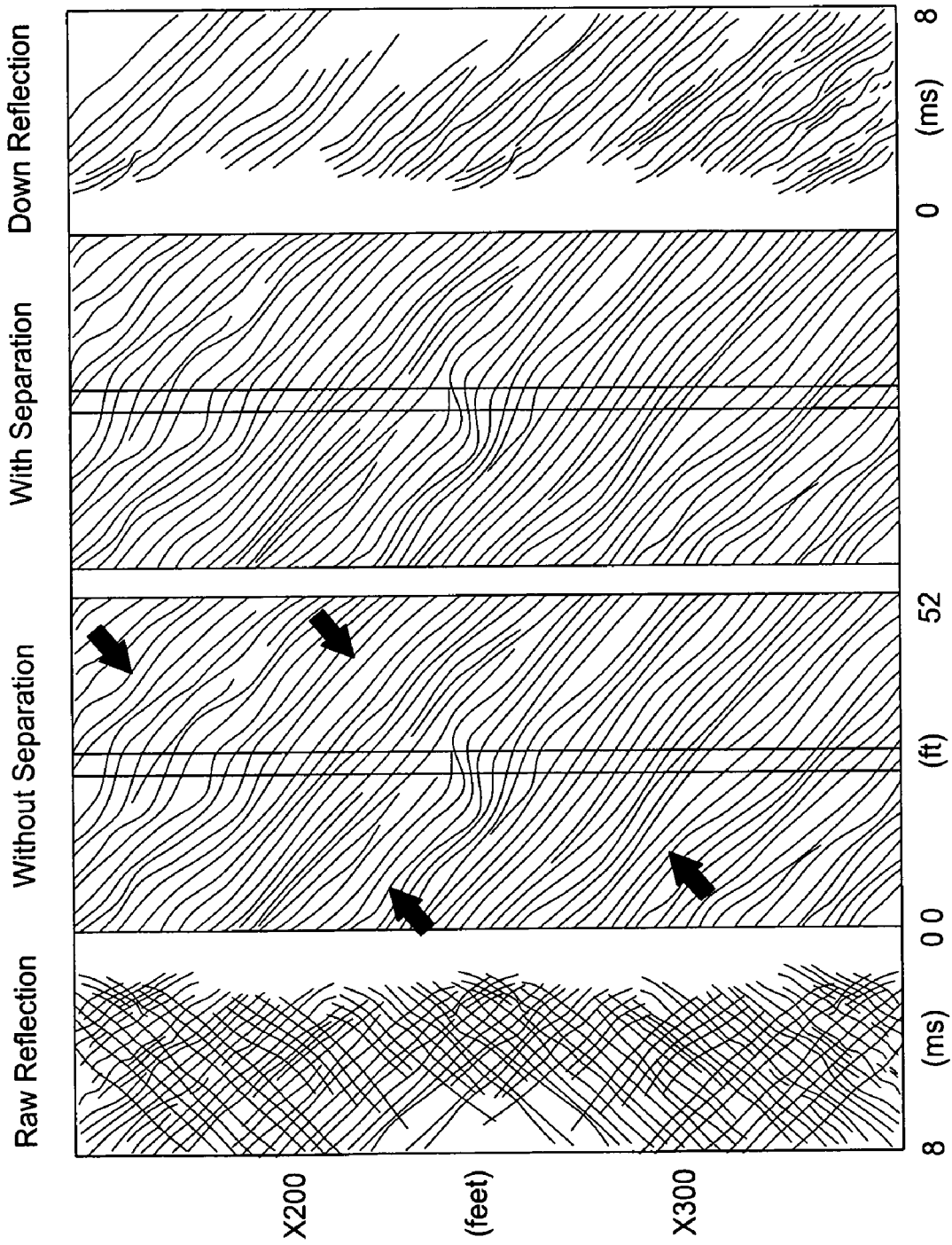
FIG. 6 provides a comparison of imaging results for up-going and down-going wave separation.

Another benefit of the down- and up-going wave separation is the removal of ghost events caused by mixed reflections from the image result. This is demonstrated in FIG. 6. Track 1 of FIG. 6 shows the result from conventional processing of the same data as in FIG. 5. As described previously, the conventional processing suppresses the direct wave using an f-k or median filtering (Hornby, 1989; Li et at, 2002). The resulting raw reflection data (track 1, plotted right to left) contains both up- and down-going reflections. Using the raw reflection data with mixed reflections, the up- and down-dip images can be obtained by projecting the data to the respective imaging area containing only the up-going (down-going) rays, as in Hornby (1989) method, or by taking only positive or negative axial wavenumber in the f-k migration, as in Zheng and Tang (2005) method. However, for a strong reflection event, the unwanted reflection (down- or up-going) may still leave some trace on the designated image (up- or down-dip), resulting in some ghost events in the image result. An example of the ghost events are illustrated in FIG. 6 (track 2, image result without up- and down-going wave separation). In the area between two oppositely pointed arrows, which corresponds to two major reflection events in the data, the down-dip (up-dip) ghost event can be seen from the up-dip (down-dip) image. In comparison, these ghost events disappear from the image result (track 3) obtained using the separated reflection data. (To facilitate the comparison, the image result and down-going reflection data of FIG. 5 are reported respectively in tracks 3 and 4 of FIG. 6.) This comparison demonstrates that separating the reflection data into downand up-going waves suppresses the unwanted ghost events due to the mixed reflections, thereby significantly improving quality of the imaging result.

Figure 7:
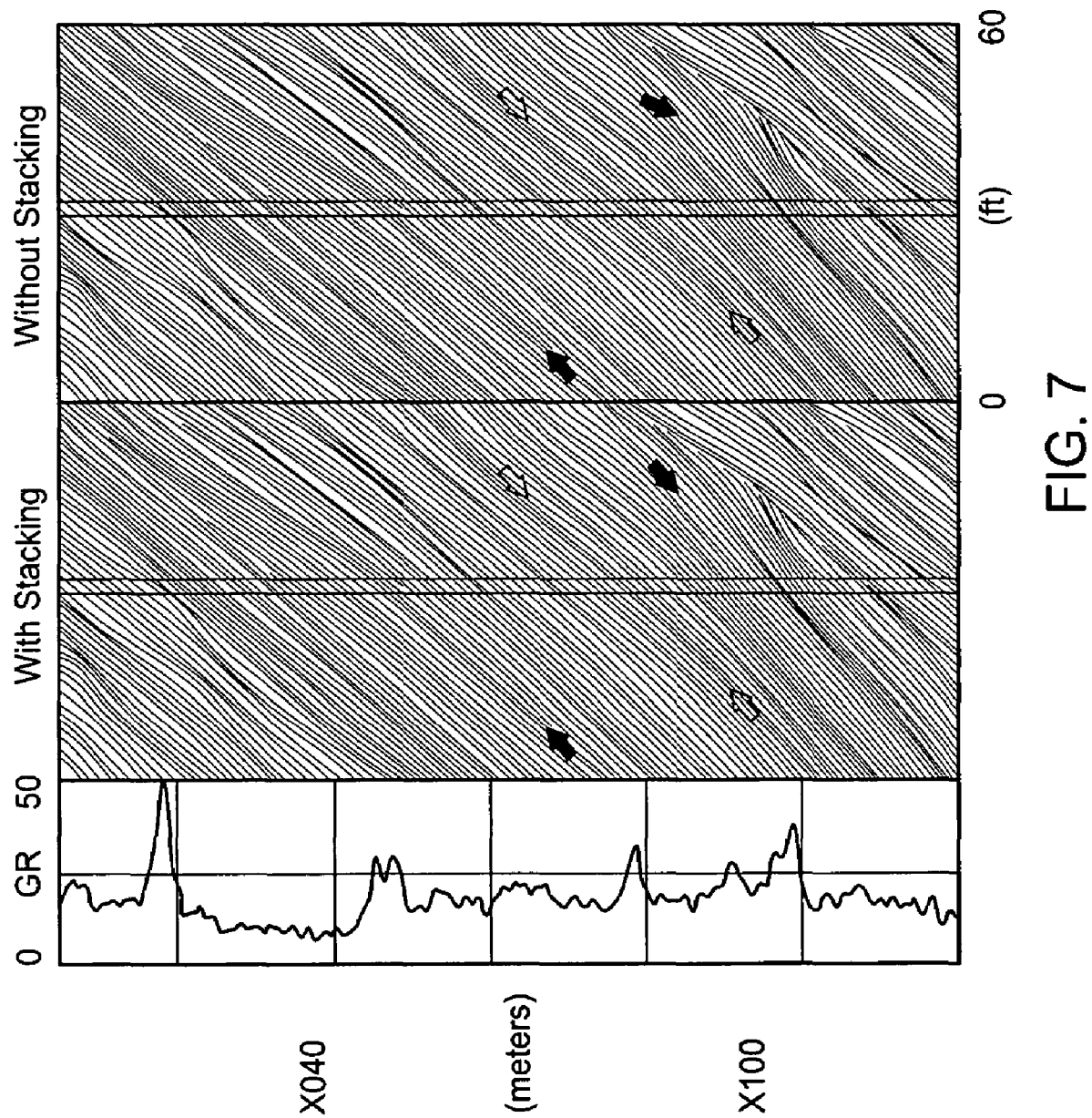
FIG. 7 demonstrates reflection data processed by enhancement stacking.

Reflection signals can be enhanced with a priori information about the bed structure intersection angle, as described in equations (6) and (7). The results provided in FIG. 7 illustrate that using the enhanced reflection data can significantly enhance the quality of the acoustic imaging result. FIG. 7 shows two image results obtained with (track 2) and without (track 3) the data enhancement. The subject formation chosen for study is a carbonate formation with several bed boundaries crossing the borehole (see the gamma ray (GR) log curve in track 1). The formation is acoustically fast relative to the borehole fluid and the acoustic data used for the imaging has a center frequency around 10 kHz. The data was first processed without the enhancement. The resulting raw image shows some noisy events, especially in the near borehole region. They represent various waves that are transmitted/converted at the boundaries near the borehole that are not properly migrated in this P-wave reflection imaging. Despite the noisy background, two major bed structures crossing the borehole respectively at the depth of X38 and X65 m can be identified. The structures make an angle of about 30° with the borehole. As explained previously, a major reflector generates a strong reflection, which without any enhancement, lends itself to be recognized even in the background of strong noise. Taking the estimated angle as the a priori value for the bed intersection angle in equation (6), the up- and down-going reflection data are enhanced by respectively staking the data across the transmitter and receiver array using equation (7). Track 2 of FIG. 7 shows the imaging result obtained by using the enhanced data.

The comparison in FIG. 7 demonstrates that enhancing reflection data enhances the image quality. The two major bed boundaries identified in the raw image (track 3) are better delineated after enhancement (track 2). Especially the down-dip structure of the lower event (crossing borehole at X65 m, as pointed to by an upward arrow), which is barely visible in the raw image, can now be clearly identified. Furthermore, a close inspection of the enhanced image shows that there is a smaller, linear event crossing the borehole at about X98 m (the event between two oppositely pointed arrows). In comparison, this event cannot be seen at all in the raw image. Finally, taking note of the event crossing the borehole at about X120 m, as pointed by a downward arrow. The up-dip structure of the event is identified in the raw image and is better delineated in the enhanced image. The down-dip image of the structure, as seen from the enhanced image, shows complicated features, which suggests that the lower side of the bed may not have sharp acoustic impedance contrast. An interesting observation is that the up-dip (right-hand side) structure of this event, as delineated by the image (both raw and enhanced), shows an intersection angle that is more that 5° smaller than that of the two events at X38 and X65 m, although the later angel (30°) was used in the date enhancement. Thus the data enhancement scheme of equations (6) and (7) can use an approximate, or even moderately inaccurate, intersection angle value for the data stacking.

Figure 8:
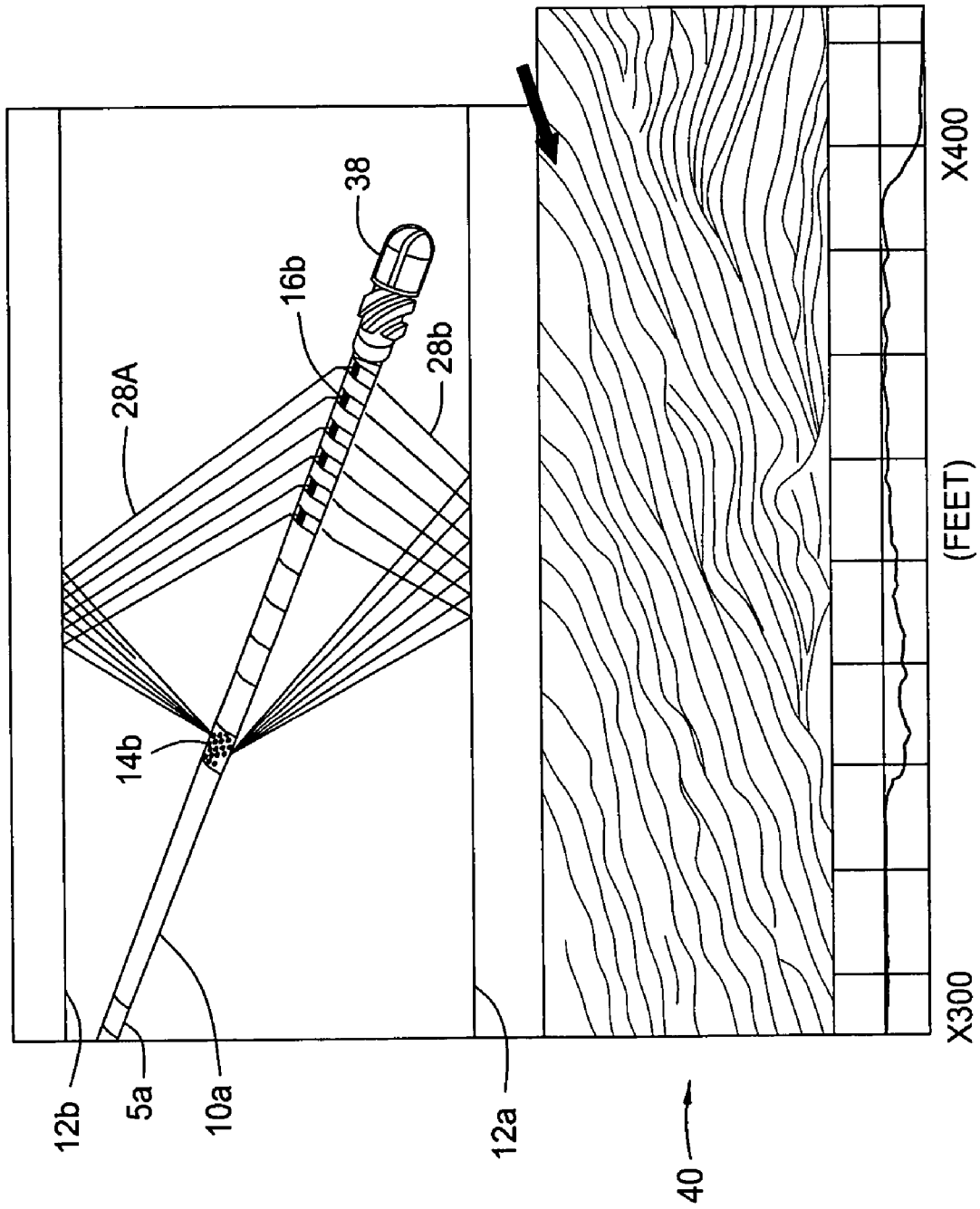
FIG. 8 illustrates a perspective view of a logging while drilling operation combined with an imaging technique.

The use of the method and apparatus herein disclosed is not limited to simple imaging applications, but is also applicable to logging while drilling (LWD) activities. More specifically, data obtained by the present method can be useful for steering during drilling operations. Because the up- and down-going reflections illuminate, respectively, the upper and lower sides of a bed boundary (see FIG. 1), they can be respectively used to image the upper and lower side of the boundary. The obtained images can then be combined to map the extension of the bed structure on both sides of the borehole. FIG. 8 illustrates the logging of an LWD array acoustic tool 10a (Joyce et al., 2001, *Introduction of a New Omnidirectional Acoustic System for Improved Real Time LWD Sonic Logging Tool Design and Field Test Results*, Paper G, in 42$^{nd}$ Annual Logging Symposium Transactions, Society of Professional Well Log Analysts) during drilling a deviated borehole. Also shown is an example of a geological formation 18a mapped using the present method during LWD operations. As the tool configuration shows, the tool 10a is placed close to the drill bit 38 and the transmitter source 14b and the drill bit 38 are located at the opposite sides of the receiver array 16b. For this configuration the direct acoustic wave emanating from the source 14b and the acoustic noise from the drill bit 38 travel in an opposite direction along the borehole 5a, preventing the drilling noise from adversely affecting the velocity analysis of the acoustic data. This configuration is also beneficial for the acoustic imaging application using the LWD acoustic data.

As the tool 10a descends into formation beds along a deviated well, it records acoustic reflections from bed boundaries above and below, as illustrated in FIG. 8. For steering the drilling operation, it is very important to know the position of a target (or major geological structural boundary) ahead of the drill bit 38. The acoustic reflections 28a recorded in the LWD data can be used to obtain the image of the target, which, in this deviated well situation, is obtained from the reflections coming from below the drill bit.

Because the transmitter source 14b is behind the receiver array 16b, the acoustic reflections 28a from the bed boundary 12a below, compared to those from the bed boundary above 12b, have a very different time moveout across the receiver array 16b, the former reflections having a much greater moveout difference relative to the direct wave than the latter reflections. This situation is analogous to the below-bed situation of FIG. 1 for an upward logging wireline tool. Because the two types of reflections have a different moveout across the receiver array, application of the wave separation method to the receiver array data, as described by equations (3) through (5), effectively suppresses the reflections from above and retains the reflections 28b from below the drill bit 38. The resulting acoustic image will show the position of the boundary below (ahead) the drill bit 38.

The data example 40 shown in FIG. 8 is from processing a field LWD acoustic data set acquired in a deviated well with 60° deviation. The acoustic data has a center frequency that is about 4 kHz. The receiver array data, together with the P-wave velocity data from the direct waves, are used to image the near-borehole structures. The result, according to the above elaboration, should give an image of geological structures below the drill bit. The bottom gamma ray curve shows a geological bed boundary at about X400 ft. The acoustic image shows clearly an event (indicated by an arrow) arising from the boundary, although the data quality, due to the noisy drilling environment, is not as good as that of the previous wire line data examples. The image of the reflector starts to form at least 50-ft away from the boundary. The bed reflector, as seen from the image, makes an angle of about 30° with the borehole, which implies that the bed is nearly horizontal for this 60°-deviation well.

The above example shows the feasibility of drilling steering using LWD acoustic data. The image was not obtained during drilling but was the result of post processing after retrieving the tool from the well. If the real time acoustic image can be obtained and viewed while drilling, a decision can then be made whether to steer the drill bit toward or away from the imaged geological boundary ahead of the drill bit.

Therefore, real time application of the above analyses and result visualization are the key to accomplish the goal of drilling steering using LWD acoustic measurement.

The method and apparatus described herein, therefore, is well adapted to attain the ends and advantages mentioned, as well as others inherent therein. While a presently preferred embodiment of the invention has been given for purposes of disclosure, numerous changes exist in the details of procedures for accomplishing the desired results. For example, the acoustic array can be the physical receiver array gathered for a common source, or the transmitter array gathered for a common receiver position, the criterion for using either array being that the reflections should have maximum moveout difference relative to the direct waves in the chosen array. These and other similar modifications will readily suggest themselves to those skilled in the art, and are intended to be encompassed within the spirit of the present invention disclosed herein and the scope of the appended claims.

What is claimed is:

1. A method of analyzing acoustic data obtained from a geological formation, said method comprising:
   receiving array acoustic data obtained by upwardly motivating a signal transmitter within a borehole piercing the geological formation, transmitting a series of signals from the signal transmitter to a geological bed, reflecting the signals from the formation to form a series of reflections, recording the reflections with a selected receiver of a receiver array, wherein with each successive recorded reflection, the distance is reduced between the transmitter and the successively selected receiver that records the reflection;
   obtaining moveout information from the array acoustic data estimating direct wave data from the array acoustic data and the moveout information;
   subtracting the direct wave data from the array acoustic data thereby obtaining residual data; and
   constructing an image of the geological formation from the residual data.

2. The method of analyzing acoustic data obtained from a geological formation of claim 1, wherein said residual data contains reflection wave data.

3. The method of analyzing acoustic data obtained from a geological formation of claim 1 wherein successive reflection recordings are at substantially the same depth in the borehole.

4. The method of analyzing acoustic data obtained from a geological formation of claim 3 wherein reducing the distance between the signal transmitter and the receiver between successive signals enhances moveout difference between the direct signals and the reflected signals.

5. The method of analyzing acoustic data obtained from a geological formation of claim 2 further comprising enhancement stacking the residual wave data to obtain reflected data.

6. The method of analyzing acoustic data obtained from a geological formation of claim 5 wherein said enhancement stacking comprises (a) selecting a time T sequentially along the total data recording time, wherein time T represents the time for the reflection wave to travel from a signal source to a designated signal receiver location $z_n$ where the reflection signal is to be estimated, (b) calculating a distance Z using the selected time T, where Z represents the distance from the signal source to the intersection of a feature, a reflection from which will have a travel time T, (c) calculating a time $T_m$ for individual signal receivers within a receiver array to receive a reflection wave from a signal source, (d) finding the residual wave data $R_m$ for each receiver within the array for the calculated time $T_m$, and (e) data sum/stacking of $R_m$ thereby obtaining wave reflection data R.

7. The method of analyzing acoustic data obtained from a geological formation of claim 6, wherein the distance $Z(T)=0.5(z_n+\sqrt{(vT)^2-z_n^2\cos^2\alpha}/\sin\alpha)$,
   wherein $\alpha$ is an estimation of the feature bed intersection angle and $v$ is wave moveout velocity.

8. The method of analyzing acoustic data obtained from a geological formation of claim 6 wherein the time $T_m=\sqrt{z_m^2+4Z(Z-z_m)\sin^2\alpha}/v$, wherein $\alpha$ is an estimation of the feature bed intersection angle and $v$ is wave moveout velocity.

9. The method of analyzing acoustic data obtained from a geological formation of claim 1 wherein signals are selected from the list consisting of compressional waves, shear waves, Stoneley waves, flexural waves.

10. The method of analyzing acoustic data obtained from a geological formation of claim 1 further comprising migrating the residue data to image a subterranean boundary bed.

11. The method of analyzing acoustic data obtained from a geological formation of claim 1, further comprising combining the method of claim 1 with a subterranean drilling operation.

12. The method of analyzing acoustic data obtained from a geological formation of claim 11, further comprising providing steering capabilities to the drilling operation using the analyzed acoustic data.

13. The method of analyzing acoustic data obtained from a geological formation of claim 1 wherein said imaging occurs above a subterranean feature.

14. The method of analyzing acoustic data obtained from a geological formation of claim 11 further comprising conducting acquiring geological imaging data below the subterranean feature.

15. The method of analyzing acoustic data obtained from a geological formation of claim 12 wherein said imaging below the subterranean feature comprises:
   upwardly motivating a signal transmitter within the borehole;
   transmitting a series of signals into a geological formation from the signal transmitter; and
   receiving the signals propagating from the signal transmitter with receivers; wherein the
   receivers are disposed between the signal transmitter and the feature.

* * * * *